(12) United States Patent
Whiting

(10) Patent No.: US 8,051,904 B1
(45) Date of Patent: Nov. 8, 2011

(54) VEHICULAR TEMPERATURE CONTROL DEVICE

(76) Inventor: Michael Whiting, West Valley, UT (US)

( * ) Notice: Subject to any disclaimer, the term of this patent is extended or adjusted under 35 U.S.C. 154(b) by 1203 days.

(21) Appl. No.: 11/752,587

(22) Filed: May 23, 2007

(51) Int. Cl.
*B60H 1/00* (2006.01)
*B60H 1/24* (2006.01)
*F25B 29/00* (2006.01)

(52) U.S. Cl. ............. 165/202; 165/41; 165/42; 165/43; 165/48.1; 165/58; 62/244; 62/235.1; 62/304; 62/314; 261/DIG. 4; 261/DIG. 43; 261/119.1

(58) Field of Classification Search .................. 165/202, 165/41, 42, 43, 48.1, 58; 62/3.61, 244, 235.1, 62/3.2, 3.7, 3.3, 304, 314; 417/362; 261/DIG. 4, 261/DIG. 43, 119.1
See application file for complete search history.

(56) References Cited

U.S. PATENT DOCUMENTS

| 3,943,726 | A | | 3/1976 | Miller |
| 4,232,211 | A | | 11/1980 | Hill |
| 4,841,742 | A | | 6/1989 | Biby |
| 4,878,359 | A | | 11/1989 | Mandell |
| 5,441,391 | A | * | 8/1995 | Frost et al. ............... 417/362 |
| 5,687,573 | A | * | 11/1997 | Shih ........................ 62/244 |
| 5,899,081 | A | | 5/1999 | Evans et al. |
| 6,453,678 | B1 | * | 9/2002 | Sundhar ................... 62/235.1 |
| 6,662,572 | B1 | * | 12/2003 | Howard .................... 62/244 |

FOREIGN PATENT DOCUMENTS

| GB | 2241378 A | * | 8/1991 |
| JP | 2001297977 A | * | 10/2001 |

* cited by examiner

*Primary Examiner* — John Ford
(74) *Attorney, Agent, or Firm* — Crossley Patent Law; Mark A. Crossley

(57) ABSTRACT

The vehicular temperature control device includes an external housing, a pair of internal compartments and a mechanism in each compartment that allows the device to either cool off or warm up an interior area within a vehicle. One of the internal compartments includes a belt, a rotating fan attached to the belt, and a volume of water for evaporative cooling. This chamber will help cool down surrounding air. The other internal compartment also includes a belt and a rotating fan attached to the belt and, furthermore, a heating coil. This second compartment is designed to assist an individual in heating up the surrounding air.

13 Claims, 6 Drawing Sheets

FIG. 3
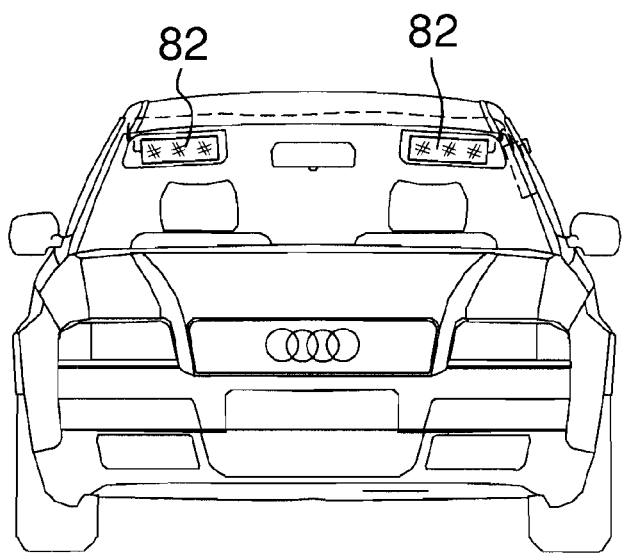
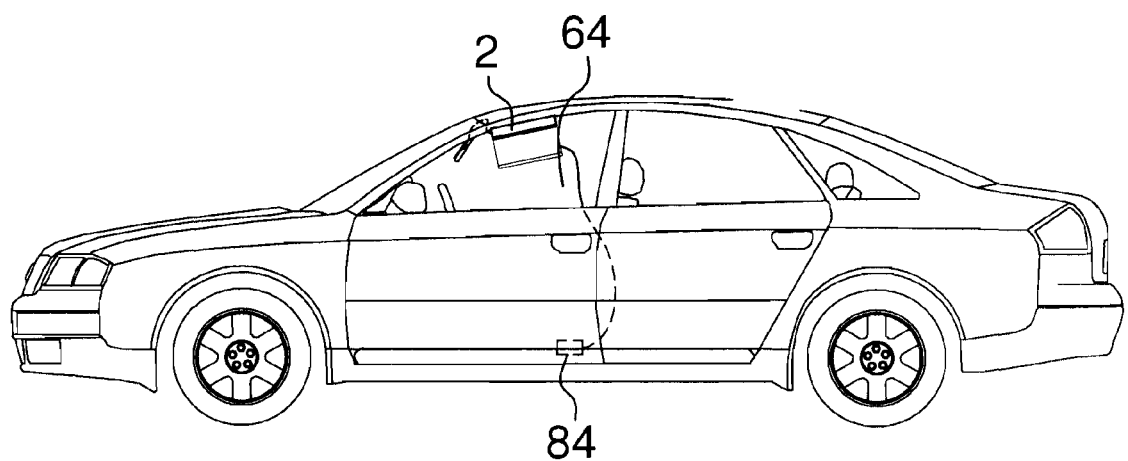
FIG. 4

VEHICULAR TEMPERATURE CONTROL DEVICE

BACKGROUND OF THE INVENTION

The present invention concerns that of a new and improved vehicular temperature control device that includes an external housing, a pair of internal compartments, and a mechanism in each compartment that allows the device to either cool off or warm up an interior area within a vehicle.

DESCRIPTION OF THE PRIOR ART

U.S. Pat. No. 5,899,081, issued to Evans et al., discloses a temperature regulation system for providing heating and cooling for the interior of a truck.

U.S. Pat. No. 4,841,742, issued to Biby, discloses a portable air conditioning unit for cars, campers, vans, tents, and other enclosures.

U.S. Pat. No. 3,943,726, issued to Miller, discloses a solar energy cell system that is used as an electric supply source to operate an air conditioner or a fan ventilation system contained within the interior chamber of an automobile.

U.S. Pat. No. 4,232,211, issued to Hill, discloses an apparatus that supplies heat to the passenger compartment of an automobile car body.

U.S. Pat. No. 4,878,359, issued to Mandell, discloses a travel accessory that is disclosed for use by persons who occasionally need to have their pets in a vehicle on a sunny day.

SUMMARY OF THE INVENTION

The present invention concerns that of a new and improved vehicular temperature control device that includes an external housing, a pair of internal compartments, and a mechanism in each compartment that allows the device to either cool off or warm up an interior area within a vehicle. One of the internal compartments includes a belt, a rotating fan attached to the belt, and a volume of water. Utilizing this chamber will help cool down surrounding air. The other internal compartment also includes a belt and a rotating fan attached to the belt, and furthermore, includes a heating coil. This second compartment is designed to assist an individual in heating up the surrounding air. The device further includes a mounting section, an on/off switch, a pair of vents (one over each compartment There has thus been outlined, rather broadly, the more important features of a vehicular temperature control device that the detailed description thereof that follows may be better understood and in order that the present contribution to the art may be better appreciated. There are, of course, additional features of the vehicular temperature control device that will be described hereinafter and which will form the subject matter of the claims appended hereto.

In this respect, before explaining at least one embodiment of the vehicular temperature control device in detail, it is to be understood that the vehicular temperature control device is not limited in its application to the details of construction and to the arrangements of the components set forth in the following description or illustrated in the drawings. The vehicular temperature control device is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present vehicular temperature control device. It is important, therefore, that the claims be regarded as including such equivalent constructions insofar as they do not depart from the spirit and scope of the present invention.

It is therefore an object of the present invention to provide a vehicular temperature control device which has all of the advantages of the prior art and none of the disadvantages.

It is another object of the present invention to provide a vehicular temperature control device which may be easily and efficiently manufactured and marketed.

It is another object of the present invention to provide a vehicular temperature control device which is of durable and reliable construction.

It is yet another object of the present invention to provide a vehicular temperature control device which is economically affordable and available for relevant market segment of the purchasing public.

Other objects, features and advantages of the present invention will become more readily apparent from the following detailed description of the preferred embodiment when considered with the attached drawings and appended claims.

BRIEF DESCRIPTION OF THE DRAWINGS

FIG. 3 shows a front view of a vehicle in which a vehicular temperature control device and a pair of solar cell panels have been mounted.

FIG. 4 shows a front view of a vehicle in which a vehicular temperature control device, a pair of solar cell panels, and a battery back-up have been mounted within the vehicle.

DESCRIPTION OF THE PREFERRED EMBODIMENT

Figure 1:
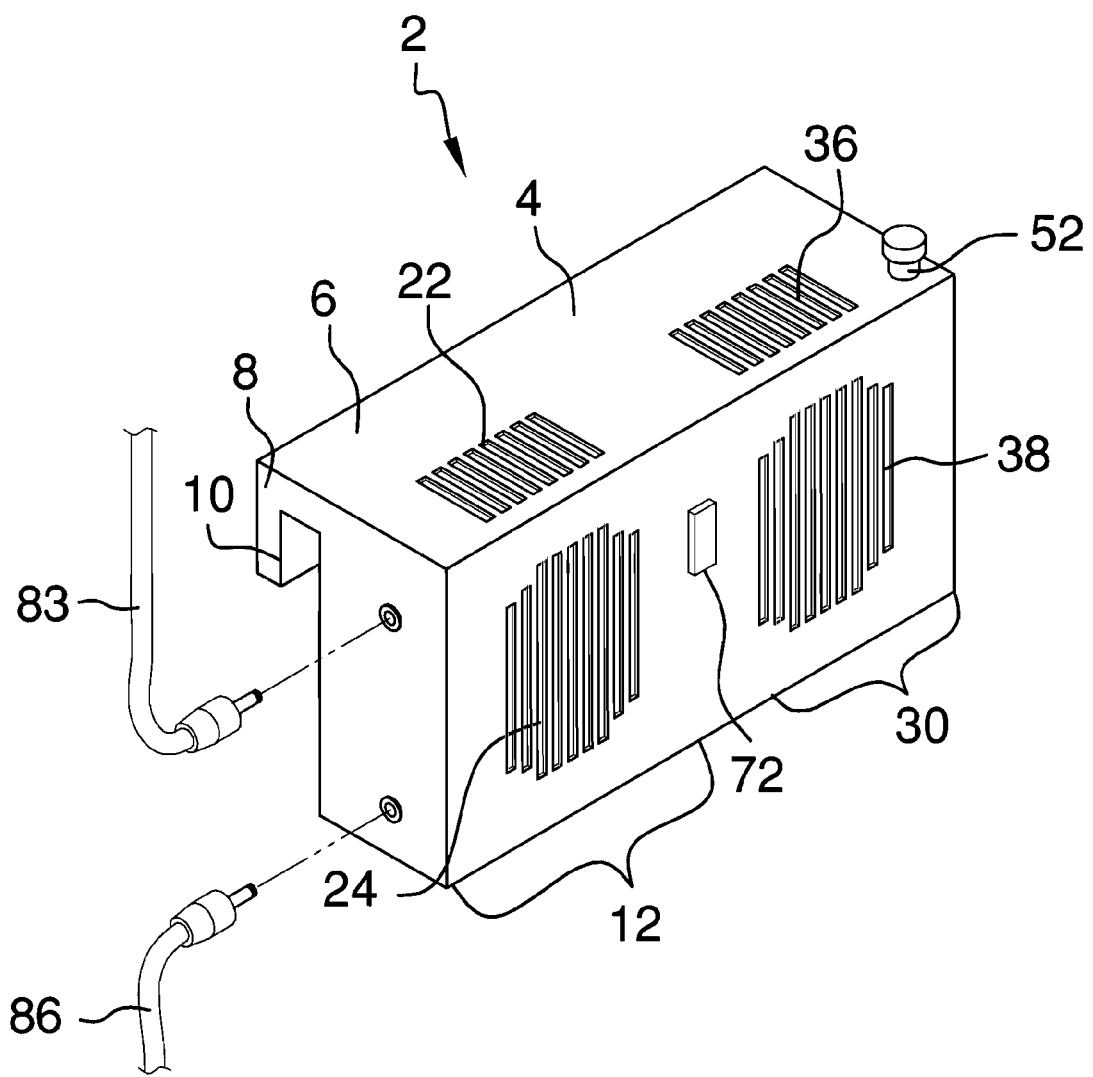
FIG. 1 shows a top perspective view of the vehicular temperature control device as it would appear in use.
Figure 2:
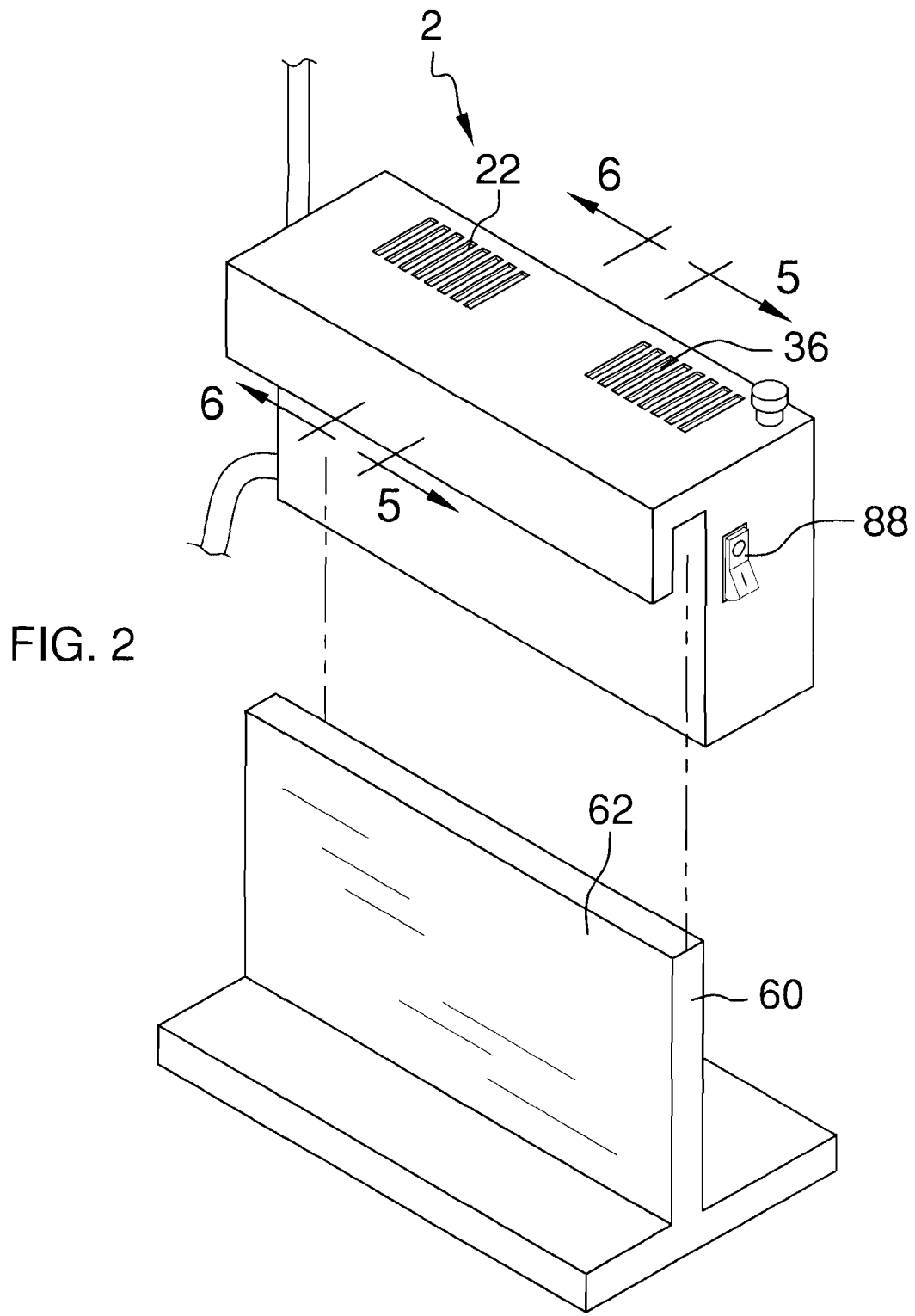
FIG. 2 shows a top perspective view of the vehicular temperature control device as it would appear being assembled and mounted on a mounting platform.

With reference now to the drawings, and in particular to FIGS. 1 through 7 thereof, a new vehicular temperature control device embodying the principles and concepts of the present invention and generally designated by the reference numeral 2 will be described.

As best illustrated in FIGS. 1 through 7, the vehicular temperature control device 2 comprises an outer casing 4 that preferably has a rectangular or box-like configuration. The outer casing 4 further includes a mounting section 6 that includes an overhanging mount 8, with this overhang mount running in the lengthwise direction of the outer casing 4. The overhanging mount 8 includes a track 10 that allows the outer casing 4 to be mounted on a wide variety of objects.

The left compartment 12 is one of two compartments within the outer casing 4. The left compartment 12 includes at least one heating coil 14 that is mounted within the left compartment 12. Furthermore, left compartment 12 includes fan wheel 16, which is axially mounted within the left compartment 12 and is powered by belt 18. Belt 18 is mounted on both the fan wheel 16, but is also mounted on a motor 20 which powers the present invention.

Left compartment has a top-mounted air intake 22, and furthermore, has an air outtake 24 that is located immediately adjacent to the fan wheel 16. The fan wheel 16, when in operation, tends to expel air within the left compartment 12 out through the air outtake 24. This air would previously had been warmed up by the presence of the heating coil 14.

The right compartment 30 is the second of two compartments within the outer casing 4. The right compartment 30 includes a bath of water 32 that is located within the right compartment 30. Furthermore, right compartment 30 includes fan wheel 33, which is axially mounted within the right compartment 30 and is powered by belt 34. Belt 34 is mounted on both the fan wheel 33, but is also mounted on a motor 20 which powers the present invention.

Right compartment has a top-mounted air intake 36, and furthermore, has an air outtake 38 that is located immediately adjacent to the fan wheel 32. The fan wheel 33, when in operation, tends to expel air within the right compartment 30 out through the air outtake 38. This air would previously had been cooled down by the presence of the bath of water 32 and would actually have picked up a bit of moisture from the bath of water 32.

Right compartment 30 further includes an access tube 52 cap that has two ends comprising a top end and a bottom end. The bottom end of the access tube 52 would be located immediately above the bath of water 32, while the top end of the access tube 52 would extend above the right compartment 30 to allow an individual to place additional water 32 into the bath of water 32.

Figure 5:
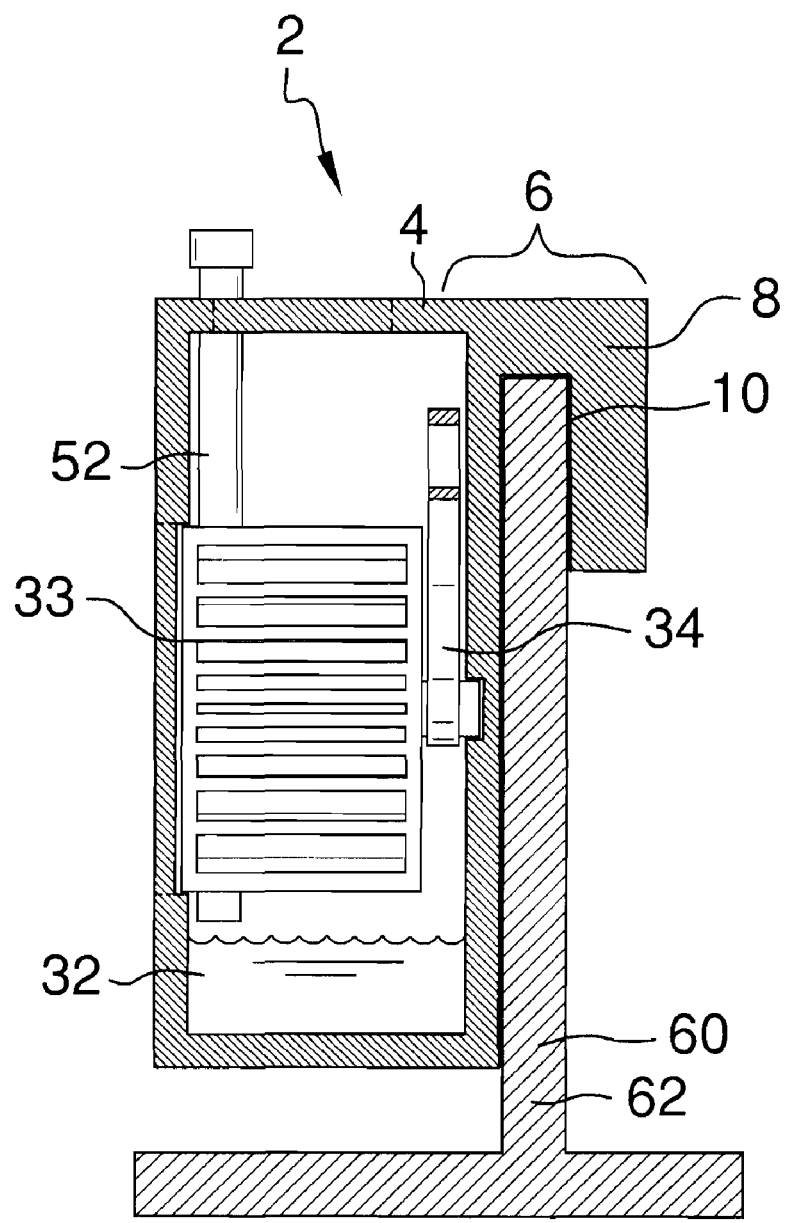
FIG. 5 shows a left side cutaway view of the vehicular temperature control device as it is would appear mounted on a mounting platform.
Figure 6:
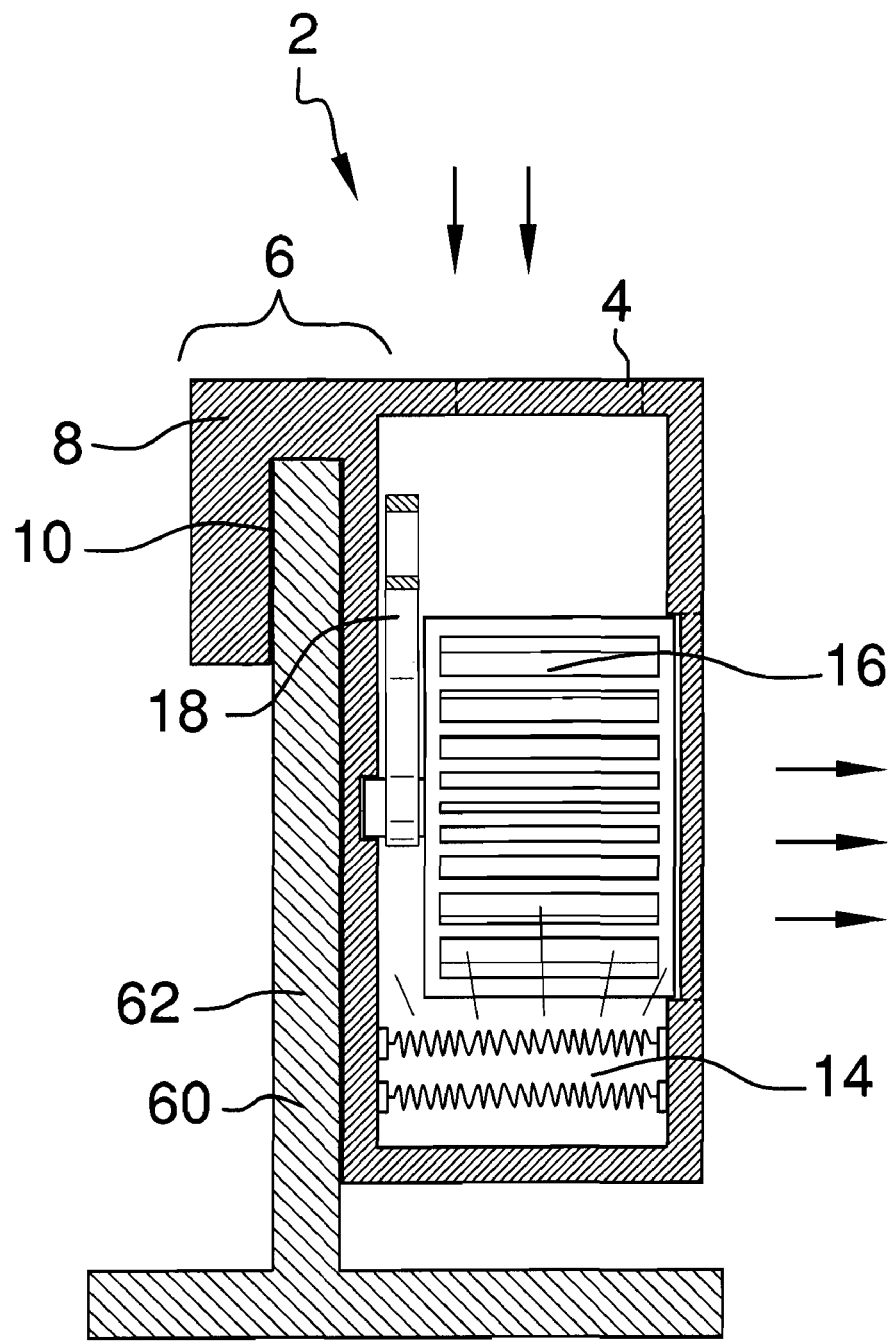
FIG. 6 shows a right side cutaway view of the vehicular temperature control device as it is would appear mounted on a mounting platform.
Figure 7:
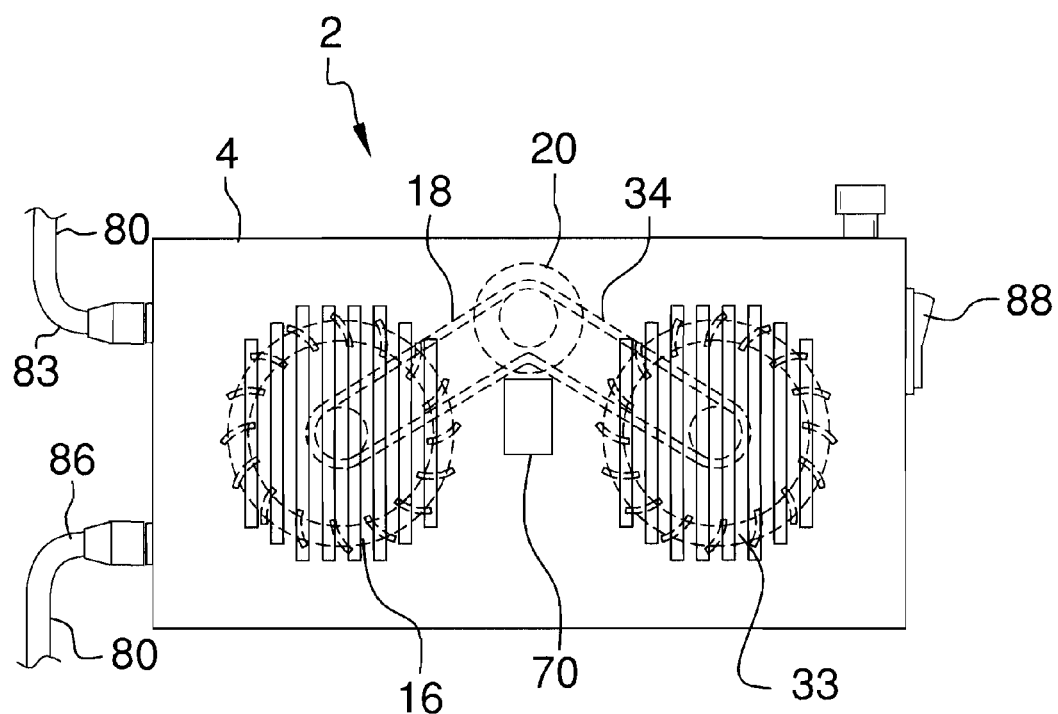
FIG. 7 shows a front cutaway view of the vehicular temperature control device as it is would appear mounted on a mounting platform.

In use, the overhanging mount 8 and the track 10 could be placed over a vertical object 60, with the vertical object 60 preferably being either a stand 62, as shown in FIGS. 5 and 6, or in the alternative, a vehicular window 64. If the vertical object 60 is a vehicular window 64, the outer casing 4 would preferably be mounted such that the outer casing would be located inside the vehicle.

The outer casing 4 further includes a thermostat 70 that would be connected to a thermostat sensor 72. The sensor 72 could be adjusted to a particular temperature. The thermostat, which is located within the outer casing 4, is connected to the motor and would cause the motor to engage either none or one of the belts, depending on the temperature needs. Once the desired temperature (as measured by the sensor 72) would be reached, then the thermostat 70 would cause the motor 20 to be turned off. The thermostat sensor 72 is attached to the outer casing 4 but is exposed to the outside air.

The device 2 would have power means 80 to provide power to it. The power means 80 is preferably both at least one solar cell 82 that is connected by a cord 83 and also a battery 84 that is connected to the device 2 by a cord 86. If solar cells 82 are to be used, there best location would be within a vehicle, mounted so that they would receive a maximum amount of sunshine. The power means 80 could also be a battery, in which case, the battery 84 would be connected to the outer casing 4 via a cord 86.

The device 2 also has a two-position switch 88 that is connected to the outer casing 4. The switch 88 essentially serves as a circuit in between the power means 80, on one end, and the thermostat 70, thermostat sensor 72, and the motor 20 on the other end. If the switch 88 is in an "off" position, then power would not flow from the power means 80 to any other item within the device 2. However, if the switch 88 is in the "on" position, then power would flow from the power means 80 to the thermostat 70, thermostat sensor 72, and the motor 20.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A vehicular temperature control device comprising:
an outer casing,
a vertical object,
means for mounting the outer casing on the vertical object,
means for having the vehicular temperature control device measure temperature on an ongoing basis,
means for having the vehicular temperature control device alter the temperature,
power means for providing power to the vehicular temperature control device,
wherein the outer casing further comprises a pair of compartments comprising a left compartment and a right compartment,
wherein the means for mounting the outer casing on the vertical object further comprises a mounting section attached to the outer casing,
wherein mounting section further comprises
an overhanging mount attached to the outer casing,
a track attached to the overhanging mount,
wherein the means for having the vehicular temperature control device alter the temperature further comprises
means for raising the temperature, said means for raising the temperature located in the first of the two compartments,
means for lowering the temperature, said means for lowering the temperature located in the second of the two compartments,
wherein the means for raising the temperature further comprises
at least one heating coil located within the first compartment,
an air intake located adjacent to the first compartment, the air intake capable of allowing air to enter into the first compartment from the outside air,
an air outtake located adjacent to the first compartment, the air outtake capable of allowing air to exit the first compartment to the outside air,
a first fan wheel axially mounted within the first compartment, the first fan wheel being located adjacent to the air outtake located adjacent to the first compartment,
means for rotating the first fan wheel,
wherein air enters the first compartment through the air intake located adjacent to the first compartment and exits the first compartment through the air outtake located adjacent to the first compartment,
wherein the means for rotating the first fan wheel further comprises
a motor mounted within the outer casing,
a first belt located within the outer casing,
wherein the first belt is attached to the fan wheel,
further wherein the first belt is also attached to the motor,
wherein the motor acts on the first belt, causing the first fan wheel to rotate,
wherein the means for lowering the temperature further comprises
a volume of water located within the second compartment,
an air intake located adjacent to the second compartment, the air intake capable of allowing air to enter in the second compartment from the outside air,
an air outtake located adjacent to the second compartment, the air outtake capable of allowing air to exit the second compartment to the outside air,
a second fan wheel axially mounted within the second compartment, the second fan wheel being located adjacent to the air outtake located adjacent to the second compartment,
means for rotating the second fan wheel, and
wherein air enters the second compartment through the air intake located adjacent to the second compartment and exits the second compartment through the air outtake located adjacent to the second compartment.

2. A vehicular temperature control device according to claim 1 wherein the means for rotating the second fan wheel further comprises
(a) a motor mounted within the outer casing,
(b) a second belt located within the outer casing,
(c) wherein the second belt is attached to the second fan wheel,
(d) further wherein the second belt is also attached to the motor,
(e) wherein the motor acts on the second belt, causing the second fan wheel to rotate.

3. A vehicular temperature control device according to claim 2 wherein the means for having the vehicular temperature control device alter the temperature further comprises
(a) a thermostat located within the outer casing, the thermostat attached to the motor,
(b) a thermostat sensor attached to the thermostat, the thermostat sensor attached to the outer casing, the thermostat sensor being exposed to the outside air.

4. A vehicular temperature control device according to claim 3 wherein the power means for providing power to the vehicular temperature control device further comprises at least one solar panel, the solar panel being connected to the vehicular temperature control device.

5. A vehicular temperature control device according to claim 4 wherein the vertical object on which the outer casing is mounted further comprises a stand.

6. A vehicular temperature control device according to claim 4 wherein the vertical object on which the outer casing is mounted further comprises a vehicular window.

7. A vehicular temperature control device according to claim 3 wherein the power means for providing power to the vehicular temperature control device further comprises at least one battery, the battery being connected to the vehicular temperature control device.

8. A vehicular temperature control device according to claim 7 wherein the vertical object on which the outer casing is mounted further comprises a stand.

9. A vehicular temperature control device according to claim 7 wherein the vertical object on which the outer casing is mounted further comprises a vehicular window.

10. A vehicular temperature control device comprising:
(a) an outer casing, the outer casing further comprises a pair of compartments comprising a left compartment and a right compartment,
(b) a vertical object,
(c) means for mounting the outer casing on the vertical object, the means for mounting the outer casing on the vertical object further comprises a mounting section attached to the outer casing, the mounting section further comprising (i) an overhanging mount attached to the outer casing and (ii) a track attached to the overhanging mount,
(d) means for having the vehicular temperature control device measure temperature on an ongoing basis,
(e) means for having the vehicular temperature control device alter the temperature, wherein the means for having the vehicular temperature control device alter the temperature further comprises (i) means for raising the temperature, said means for raising the temperature located in the first of the two compartments and (ii) means for lowering the temperature, said means for lowering the temperature located in the second of the two compartments, wherein the means for raising the temperature further comprises (i) at least one heating coil located within the first compartment, (ii) an air intake located adjacent to the first compartment, the air intake capable of allowing air to enter into the first compartment from the outside air, (iii) an air outtake located adjacent to the first compartment, the air outtake capable of allowing air to exit the first compartment to the outside air, (iv) a first fan wheel axially mounted within the first compartment, the first fan wheel being located adjacent to the air outtake located adjacent to the first compartment, (v) means for rotating the first fan wheel, and (vi) wherein air enters the first compartment through the air intake located adjacent to the first compartment and exits the first compartment through the air outtake located adjacent to the first compartment, further wherein the means for lowering the temperature further comprises (i) a volume of water located within the second compartment, (ii) an air intake located adjacent to the second compartment, the air intake capable of allowing air to enter into the second compartment from the outside air, (iii) an air outtake located adjacent to the second compartment, the air outtake capable of allowing air to exit the second compartment to the outside air, (iv) a second fan wheel axially mounted within the second compartment, the first fan wheel being located adjacent to the air outtake located adjacent to the second compartment, (v) means for rotating the second fan wheel, and (vi) wherein air enters the second compartment through the air intake located adjacent to the second compartment and exits the second compartment through the air outtake located adjacent to the second compartment, further wherein the means for having the vehicular temperature control device alter the temperature further comprises a thermostat located within the outer casing, the thermostat attached to the motor, further wherein the means for having the vehicular temperature control device alter the temperature further comprises a thermostat sensor attached to the thermostat, the thermostat sensor attached to the outer casing, the thermostat sensor being exposed to the outside air, and (f) power means for providing power to the vehicular temperature control device.

11. A vehicular temperature control device according to claim 10 wherein the means for rotating the first fan wheel further comprises
   (a) a motor mounted within the outer casing,
   (b) a first belt located within the outer casing,
   (c) wherein the first belt is attached to the fan wheel,
   (d) further wherein the first belt is also attached to the motor,
   (e) wherein the motor acts on the first belt, causing the first fan wheel to rotate.

12. A vehicular temperature control device according to claim 11 wherein the means for rotating the second fan wheel further comprises
   (a) a motor mounted within the outer casing,
   (b) a second belt located within the outer casing,
   (c) wherein the second belt is attached to the second fan wheel,
   (d) further wherein the second belt is also attached to the motor,
   (e) wherein the motor acts on the second belt, causing the second fan wheel to rotate.

13. A vehicular temperature control device comprising:
   (a) an outer casing, the outer casing further comprises a pair of compartments comprising a left compartment and a right compartment,
   (b) a vertical object, the vertical object being a vehicular window,
   (c) means for mounting the outer casing on the vertical object, the means for mounting the outer casing on the vertical object further comprises a mounting section attached to the outer casing, the mounting section further comprising (i) an overhanging mount attached to the outer casing and (ii) a track attached to the overhanging mount,
   (d) means for having the vehicular temperature control device measure temperature on an ongoing basis,
   (e) means for having the vehicular temperature control device alter the temperature, wherein the means for having the vehicular temperature control device alter the temperature further comprises (i) means for raising the temperature, said means for raising the temperature located in the first of the two compartments and (ii) means for lowering the temperature, said means for lowering the temperature located in the second of the two compartments, wherein the means for raising the temperature further comprises (i) at least one heating coil located within the first compartment, (ii) an air intake located adjacent to the first compartment, the air intake capable of allowing air to enter into the first compartment from the outside air, (iii) an air outtake located adjacent to the first compartment, the air outtake capable of allowing air to exit the first compartment to the outside air, (iv) a first fan wheel axially mounted within the first compartment, the first fan wheel being located adjacent to the air outtake located adjacent to the first compartment, (v) means for rotating the first fan wheel, and (vi) wherein air enters the first compartment through the air intake located adjacent to the first compartment and exits the first compartment through the air outtake located adjacent to the first compartment, further wherein the means for lowering the temperature further comprises (i) a volume of water located within the second compartment, (ii) an air intake located adjacent to the second compartment, the air intake capable of allowing air to enter into the second compartment from the outside air, (iii) an air outtake located adjacent to the second compartment, the air outtake capable of allowing air to exit the second compartment to the outside air, (iv) a second fan wheel axially mounted within the second compartment, the first fan wheel being located adjacent to the air outtake located adjacent to the second compartment, (v) means for rotating the second fan wheel, and (vi) wherein air enters the second compartment through the air intake located adjacent to the second compartment and exits the second compartment through the air outtake located adjacent to the second compartment, further wherein the means for having the vehicular temperature control device alter the temperature further comprises a thermostat located within the outer casing, the thermostat attached to the motor, further wherein the means for having the vehicular temperature control device alter the temperature further comprises a thermostat sensor attached to the thermostat, the thermostat sensor attached to the outer casing, the thermostat sensor being exposed to the outside air, and
   (f) power means for providing power to the vehicular temperature control device, said power means for comprising at least one solar panel, said solar panel being connected to the vehicular temperature control device.

* * * * *